United States Patent
Takano

(10) Patent No.: US 7,982,922 B2
(45) Date of Patent: Jul. 19, 2011

(54) IMAGE PROCESSING APPARATUS AND IMAGE PROCESSING METHOD FOR CONFIRMING ELECTRONIC DATA CHARACTER QUALITY, AND COMPUTER PROGRAM THEREFOR

(75) Inventor: Junichi Takano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1147 days.

(21) Appl. No.: 11/204,007

(22) Filed: Aug. 16, 2005

(65) Prior Publication Data

US 2006/0039609 A1    Feb. 23, 2006

(30) Foreign Application Priority Data

Aug. 20, 2004 (JP) .................. 2004-241198

(51) Int. Cl.
*H04N 1/00* (2006.01)
*G06K 9/00* (2006.01)
(52) U.S. Cl. ........ 358/462; 358/400; 358/474; 382/173; 382/177
(58) Field of Classification Search .................. 358/1.2, 358/462, 474; 382/190, 173, 177; 345/619; 715/801
See application file for complete search history.

(56) References Cited

U.S. PATENT DOCUMENTS

| | | | |
|---|---|---|---|
| 6,249,353 B1* | 6/2001 | Yoshida et al. ................. | 358/1.9 |
| 6,298,173 B1* | 10/2001 | Lopresti .......................... | 382/305 |
| 6,909,522 B1 | 6/2005 | Nishida | |
| 7,466,875 B1* | 12/2008 | Siegel et al. .................... | 382/286 |
| 2002/0036788 A1* | 3/2002 | Hino ............................... | 358/1.11 |
| 2002/0154343 A1* | 10/2002 | Chiu et al. ...................... | 358/474 |
| 2004/0190025 A1* | 9/2004 | Nomura et al. ................. | 358/1.9 |
| 2005/0179937 A1* | 8/2005 | Horihata ......................... | 358/1.15 |
| 2006/0001690 A1* | 1/2006 | Martinez et al. ................ | 347/19 |

FOREIGN PATENT DOCUMENTS

| | | |
|---|---|---|
| JP | 11105347 | 4/1999 |
| JP | 11341198 | 12/1999 |
| JP | 2000-234610 | 8/2000 |
| JP | 2000-236410 | 8/2000 |
| JP | 200294760 | 3/2002 |
| JP | 2002091946 | 3/2002 |
| JP | 2002190937 | 7/2002 |
| JP | 2003-264672 | 9/2003 |
| JP | 200456658 | 2/2004 |
| JP | 2004172874 | 6/2004 |
| WO | 02101567 | 12/2002 |

* cited by examiner

Primary Examiner — Sudhanshu C Pathak
Assistant Examiner — Kent Yip
(74) Attorney, Agent, or Firm — Fitzpatrick, Cella, Harper & Scinto

(57) ABSTRACT

According to the present invention, an image processing apparatus comprises scanning unit that converts a original image into image data; extraction unit that extracts an area that contains characters of every character size from the image data scanned by the scanning unit; and display unit that displays images of the area that contains characters extracted by the extraction unit at a plurality of resolutions.

10 Claims, 15 Drawing Sheets

IMAGE PROCESSING APPARATUS AND IMAGE PROCESSING METHOD FOR CONFIRMING ELECTRONIC DATA CHARACTER QUALITY, AND COMPUTER PROGRAM THEREFOR

FIELD OF THE INVENTION

This invention relates to an image processing apparatus and image processing method, and a computer program therefor, that treat a document on paper or the like, for example, as electronic data, and perform image processing on that electronic data.

BACKGROUND OF THE INVENTION

Conventionally, there is an image processing apparatus such as a multifunction copier (MFP) equipped with a so-called scan/send function. An image processing apparatus equipped with a scan/send function can scan a paper document with an image scanning unit such as an image scanner, digitize the image, send the electronic data to an external storage medium and store the data therein. When digitizing a document with an image processing apparatus in this manner, typically, the user wants two things: (1) When the document electronic data (hereinafter called a digitized document) is made visible by display or by printing (hereinafter called reproduction), the quality of the characters in the reproduced document should be within a range such as to allow the user to read the document without hardship and to use the reproduced document for business purposes without difficulty; (2) the data size should be as small (that is, as easy to handle) as possible.

However, the quality of the digitized document thus produced cannot be confirmed unless a file of the digitized document (an electronic file) is opened and reproduced with a personal computer (PC) or the like having a reproduction capability. As a result, once the user opens the digitized document with a PC or the like and confirms that the desired quality (if characters, the character quality) has not been achieved, the user must redo the work of digitizing the document using an MFP. Consequently, the further apart the apparatus used for reproduction (for example a PC) and the apparatus used to carry out digitization (for example an MFP), the greater the loss of time.

A variety of proposals have been made to solve this problem. For example, as one such solution, an arrangement has been proposed in which the digitized document is reproduced by printing the digitized document prior to sending the electronic data to the storage medium and enabling the user to confirm the quality of the digitized document then and there (for example, see Japanese Patent Application Laid-open No. 2000-236410). In addition, an arrangement has been proposed in which a portion of the scanned electronic data is displayed on, for example, a liquid crystal display (LCD) of an apparatus used for digitization (MFP), enabling the user to confirm the quality of the digitized document then and there (for example, see Japanese Patent Application Laid-open No. 2003-264672).

However, executing printing of a document each time that document is digitized as with the invention described in Japanese Patent Application Laid-open No. 2000-236410 results in a waste of paper. In addition, with Japanese Patent Application Laid-open No. 2003-264672, it is necessary for the user to determine by trial and error that portion of the document the quality of which the user wishes most to confirm, for example the part with the smallest print, in order to display that portion on an LCD or other display unit, which is time-consuming.

SUMMARY OF THE INVENTION

The present invention is conceived in light of the foregoing conventional art, and has as an object to provide an image processing apparatus that displays individual character areas of different character size so as to permit easy confirmation of character quality with even a small screen, and moreover, displays arbitrary resolutions for easy selection of an image of a desired resolution. Further, the present invention has as an object to provide an image processing apparatus capable of performing high-speed resolution conversion, including also resolution selection.

To achieve the foregoing objects, the present invention provides the following structure, that is:

an image processing apparatus comprising:

scanning unit that converts a original image into image data;

extraction unit that extracts an area that contains characters of every character size from the image data scanned by the scanning unit; and display unit that displays images of the area that contains characters extracted by the extraction unit at a plurality of resolutions.

According to the above-described structures, the present invention permits easy confirmation of character quality with even a small screen by limiting the portion to be confirmed within the scanned image. In addition, the present invention makes selection of an arbitrary resolution easy. Further, the present invention makes it possible to perform high-speed resolution conversion by processing not all the digitized data digitized but only a minimum necessary range.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

First Embodiment

Image Processing System Configuration

This invention is implemented by an image processing system that treats a paper medium as electronic data and sends the electronic data to an external storage medium. A description is given below of an image processing system of an embodiment according to the present invention.

Figure 1:
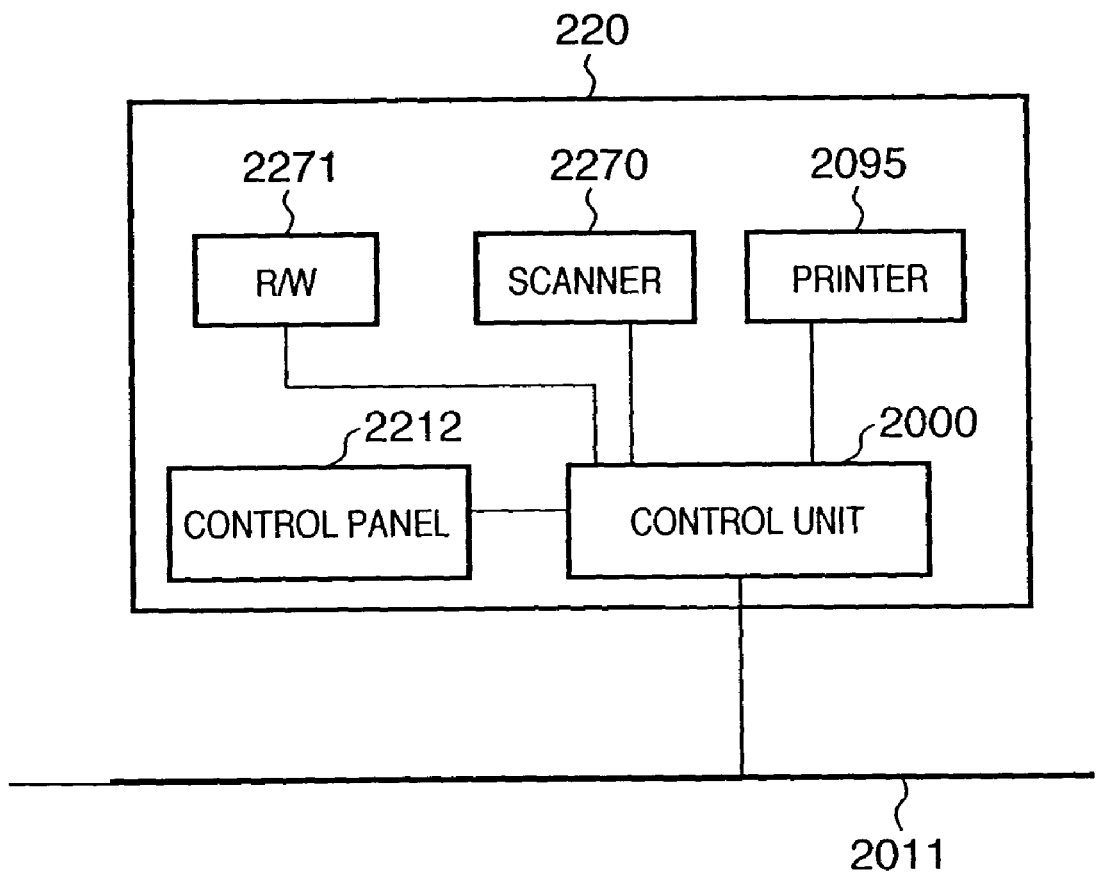
FIG. 1 is a block diagram showing the entire structure of an image processing system according to one embodiment of the present invention.

FIG. 1 is a block diagram showing the configuration of the image processing system of the present embodiment. In FIG. 1, a multifunction peripheral device (hereinafter MFP) 220 is comprised of a scanner unit 2070 that is an image input device, a printer unit 2095 that is an image output device, a control unit 2000, a control panel 2212 that is a user interface, and a reader/writer 2271 that writes to and reads from an external storage medium. The scanner unit 2070, the printer unit 2095, and the control panel 2212 are each connected to the control unit 2000 and controlled by commands from the control unit 2000. In addition, the control unit 2000 is connected to a network transmission means such as a LAN 2011. Moreover, in addition to the MFP 220, a second MFP 200 may be connected to the LAN 2011.

Figure 2:
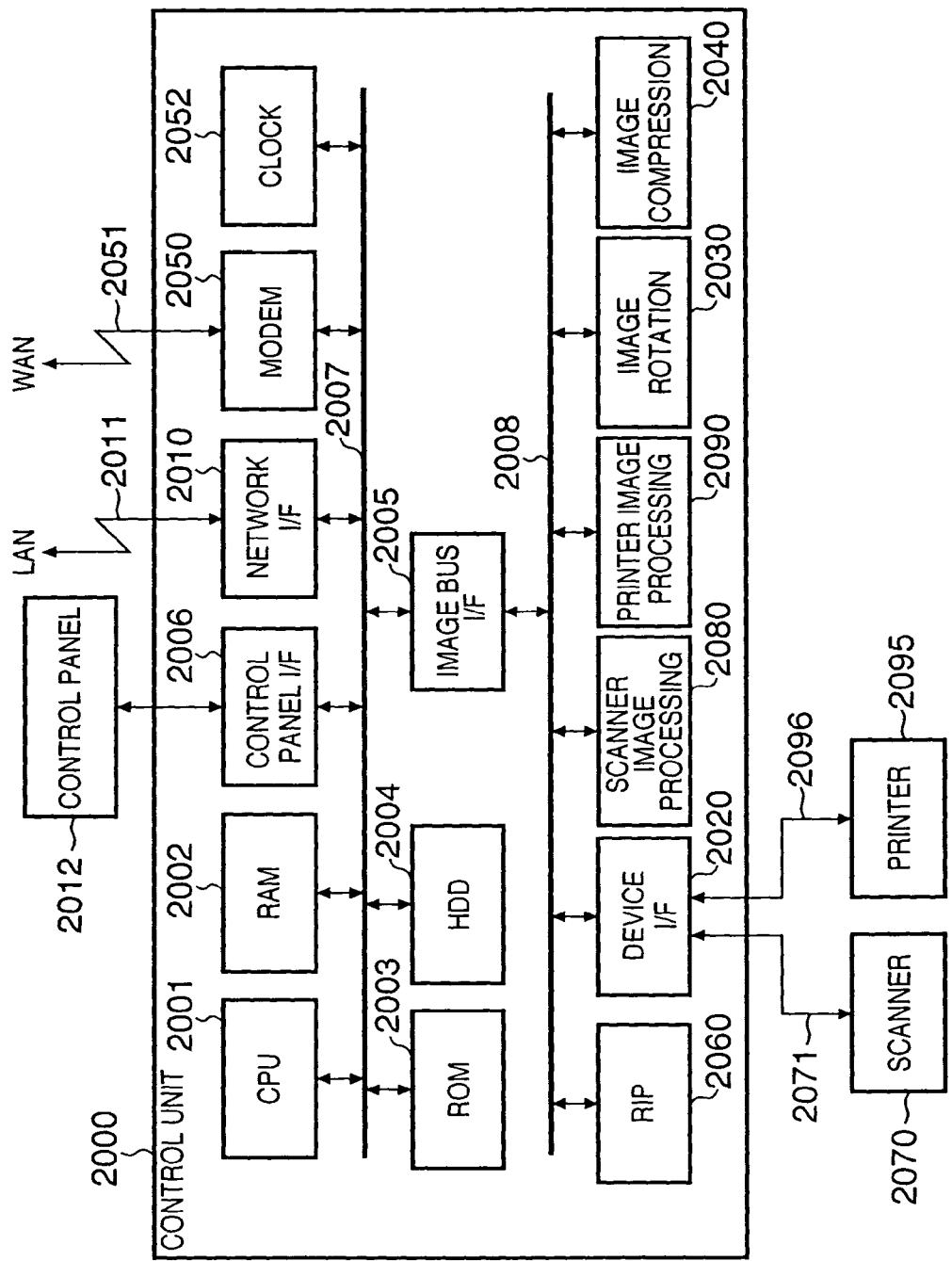
FIG. 2 is a block diagram showing the detailed configuration of a control unit.

FIG. 2 is a block diagram showing the detailed configuration of the control unit 2000 of the MFP 220. As shown in FIG. 2, the control unit 2000 is connected to an image input device that is the scanner 2070 and the printer 2095 that is an image output device, and at the same time is connected to the LAN 2011 or a Wide Area Network (WAN) 2051, and thus acts as a controller that inputs and outputs image information, device information and the like.

At the control unit 2000, a CPU 2001 controls the entire system. Internal clock 2052 control is also included in the control by the CPU 2001. A RAM 2002 is a memory used as a work memory and the like for the operation of the CPU 2001. It should be noted that the RAM 2002 is an image memory for temporary storage of image data. A ROM 2003 is a boot ROM, in which is stored a system boot program. A HDD 2004 is a hard disk drive, in which are stored system software, image data, image processing algorithms necessary to carry out guarantee/identification of originals, and reader/write control information and the like.

A control panel I/F 2006 effects an interface with a control panel (UI) 2012, and outputs to the control panel 2012 image data to be displayed on the control panel 2012. In addition, the control panel I/F 2006 serves the function of transmitting information that the user inputs through the control panel 2012 to the CPU 2001.

A network interface 2010 effects a connection to the LAN 2011, and carries out input and output of information to the LAN 100. A modem 2050 effects a connection to the Wide Area Network and carries out input and output of information to the Wide Area Network. The aforementioned devices are connected to a system bus 2007.

An image bus interface 2005 connects the system bus 2007 and an image bus 2008 that transmits image data at high speed, and is a bus bridge that converts data structures. The image bus 2008 is composed of a PCI bus or an IEEE 1394. The following devices are connected to the image bus 2008:
A raster image processor (RIP) 2060, which renders PDL code transmitted from the network into bit map images, and a device I/F 2020, which connects the scanner 2070, which is an image input/output device, and the printer 2095 to the control unit 2000, and carries out image data conversion between a synchronous system and asynchronous system.

A scanner image processor 2080 carries out recognition, correction, processing and editing of image data input from the scanner 2070. A printer image processing unit 2090 carries such processing of the print output image data as printer correction, resolution conversion and addition of electronic information. An image rotation unit 2030 rotates the image data. An image data compression unit 2040 caries out JPEG compression/decompression of multilevel image data, and JBIG, MMR and MH compression of binary image data. The clock 2052 displays the time and manages a weekly timer function standard time, and in this invention acts to provide registration date and time information in response to a request from an identification system.

The scanning resolution of the scanner 2070 can be changed depending on the operation of the control unit 2000. Accordingly, for example, such methods as changing the cycle of the sampling of output signals from a CCD line sensor 18, or thinning the pixels of the digitized image data, may be adopted.

In the foregoing configuration, the image data scanned by the scanner 2070 is stored in the RAM 2004 through the image bus interface 2005 and can be image-processed (for example, enlarged or reduced) by the CPU 2001. If necessary, the image data can be image-processed at the scanner image processor 2080. In addition, the image-processed image data can be stored on the HDD 2004 or stored in a removable storage device other than a HDD. Moreover, the image data can be transmitted to a device such as a personal computer connected through the LAN 2011 or the Wide Area Network 2051. Of course, the image data can also be stored in or transmitted to a medium as is, without any image processing whatsoever.

Figure 3:
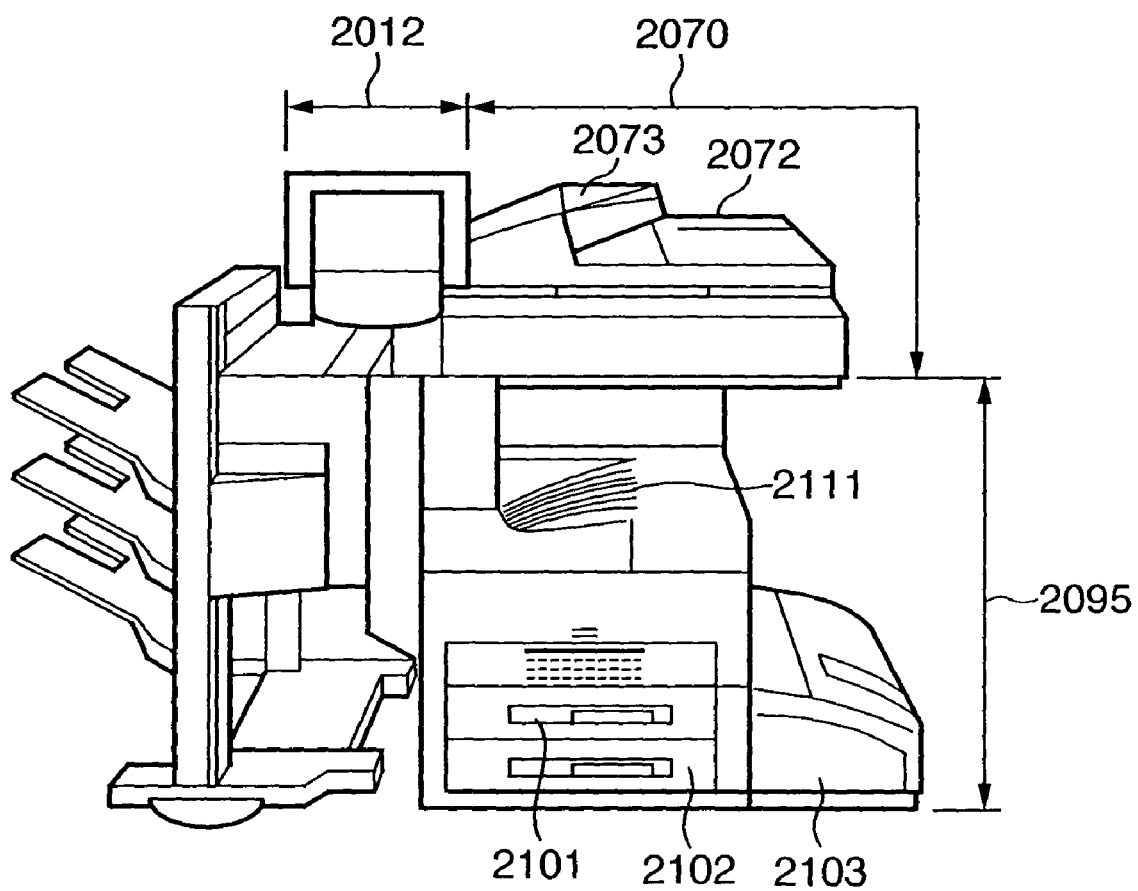
FIG. 3 is a diagram showing an external view of an image processing apparatus according to the embodiment.

FIG. 3 shows an external view of the MFP 220 of the present embodiment. The MFP 220 shown in FIG. 3 is configured so that the scanner 2070 that is an image input device is disposed on top of the printer 2095. The scanner 2070 that is the image input device optical scans by scanning an image on paper with a CCD line sensor, not shown, and generating raster image data that it then outputs. When the user sets the paper to a tray 2073 of a paper feeder 2072 and uses the control panel 2012 to instruct the apparatus to start scanning, under the control of the controller CPU 2001, the scanner 2070 feeds the paper one sheet at a time to a scanning position and scans the image on the paper, that is, scans the image optically and converts it into digital data.

In addition, the printer 2095 that is an image output device is a part that prints raster image data on paper. As methods therefor there is the electrophotographic method, using a photosensitive drum or photosensitive belt, and the inkjet method, which ejects ink from tiny nozzle arrays and prints the image directly on the paper. Either method is acceptable. It should be noted that printing is started by an instruction from the controller CPU 2001.

In addition, the printer 2095 has a plurality of sheet feeding trays so as to allow selection of different paper sizes and different paper orientations, each with their respective paper cassettes 2101, 2102 and 2103. In addition, a discharge tray 2111 accepts paper that has been printed.

Figure 4:
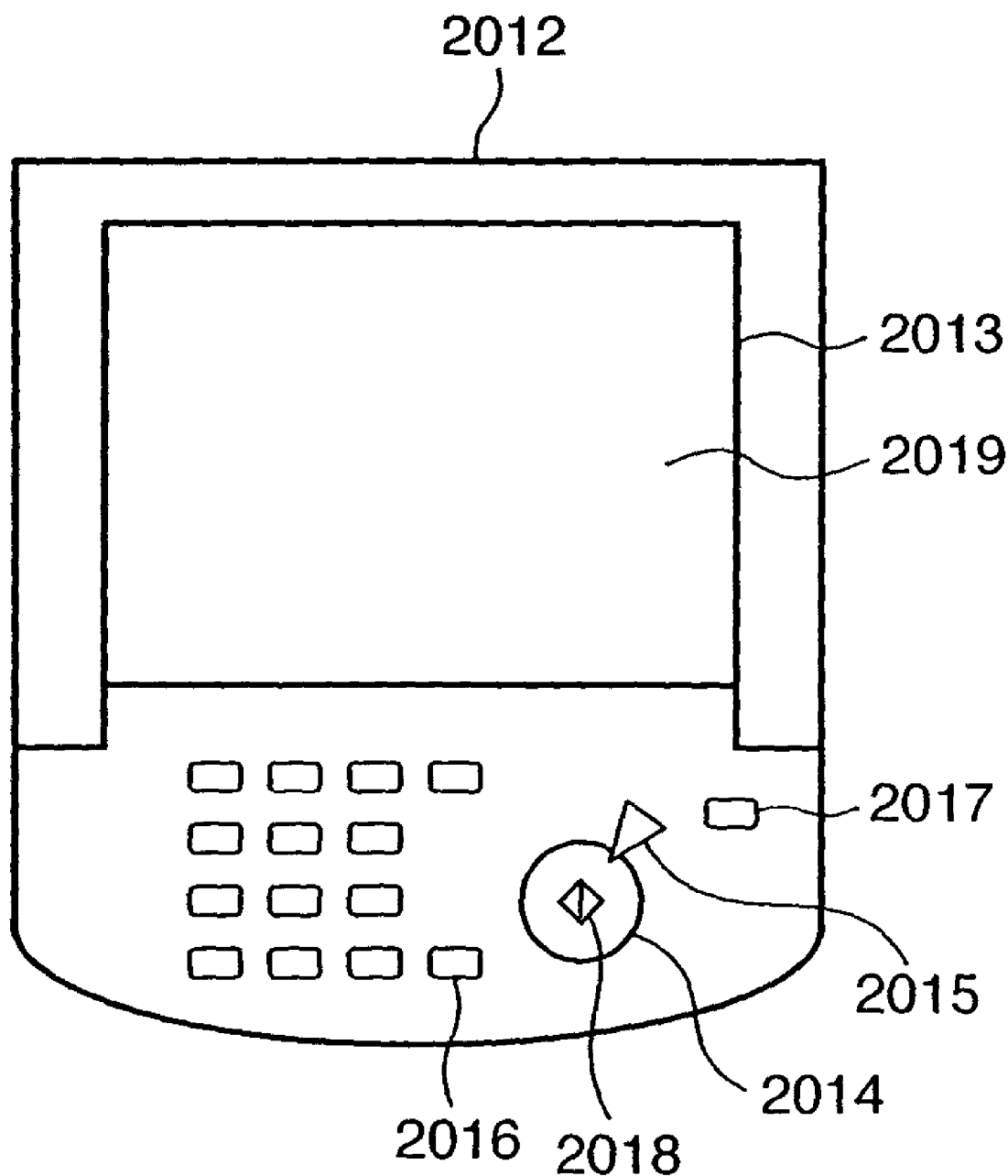
FIG. 4 is a diagram showing an external view of the control panel 2012 shown in FIG. 3.

FIG. 4 is a diagram showing the configuration of the control panel 2012 shown in FIG. 3. As shown in FIG. 4, a touch panel sheet 2019 is affixed atop an LCD of an LCD display unit 2013, on which system control screens and soft keys are displayed, and, when a position on the touch panel corresponding to the displayed key is pressed, position information indicating that pressed position is sent to the controller CPU 2001, by which the CPU 2001 can identify the pressed key.

A start key 2014 shown in FIG. 4 is used when starting scanning of an image on paper. In the center of the start key 2014 lies a display section 2018 composed of two color LED, green and red, which indicate whether or not the start key 2014 can be used. In addition, a stop key 2015 acts to stop an operation in progress. An ID key 2016 is used when inputting a user's user ID, and further, a reset key 2017 is used when initializing settings from the control panel.

Figure 5:
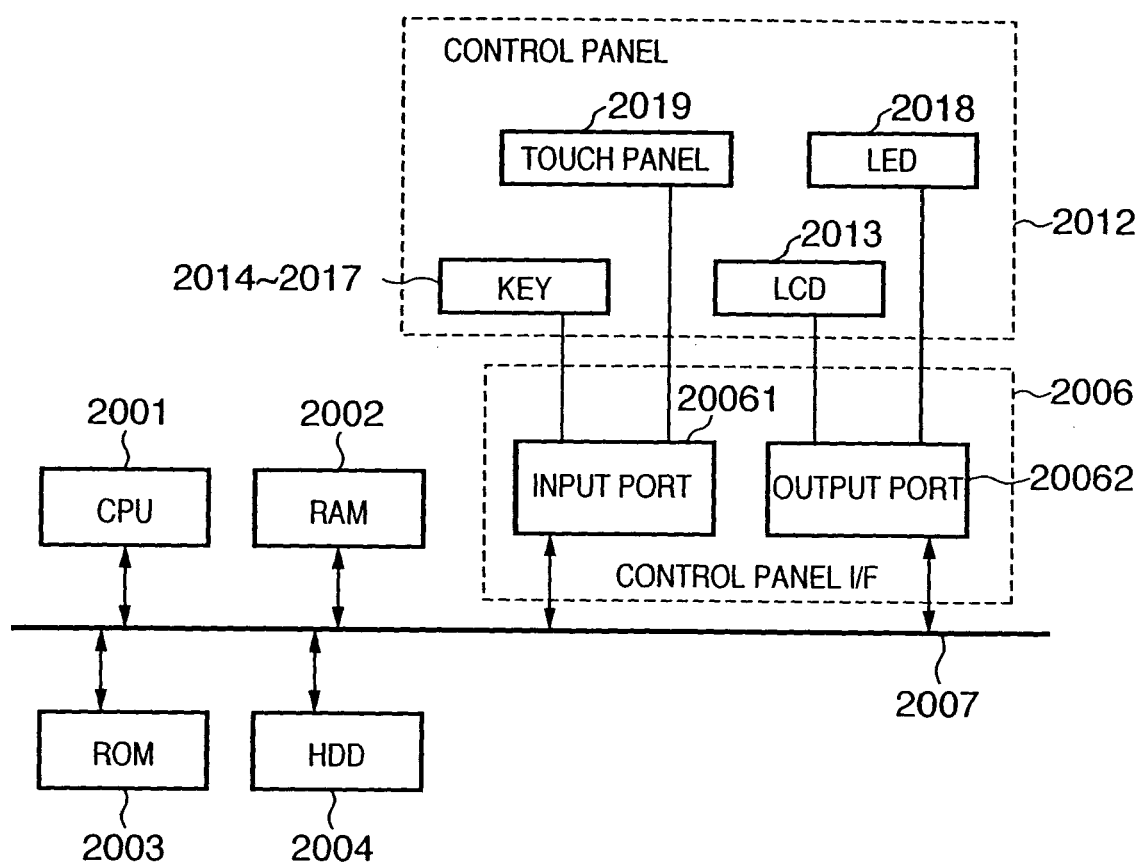
FIG. 5 is a block diagram showing the detailed configuration of the control panel shown in FIG. 2.

FIG. 5 is a block diagram showing the detailed configuration of the control panel 2012 of the MFP 200 shown in FIG. 2. As described above, the control panel 2012 is connected to the system bus 2007 through the control panel I/F 2006. The CPU 2001, the RAM 2002, the ROM 2003 and the HDD 2004 are connected to the system bus 2007. The CPU 2001 comprehensively controls access to the various devices connected to the system bus 2007 based on a control program or the like stored on the ROM 2003 and the HDD 2004. In addition, the CPU 2001, through the device I/F 2020, reads input information (image data) from the scanner 2070 and sends the image data thus read through the device I/F 2020 to the scanner image processor 2080 or, depending on the user application, the image rotation unit 2030. If the operation is copying, then image signals are output to the printer 2095 as output information. If the operation is creation of a digitized document (filing), then the read or further-processed image data is saved as an electronic file or transmitted externally. In addition, the RAM 2002 functions as the CPU 2001 main memory and work area.

(Data Structure)

Figure 6:
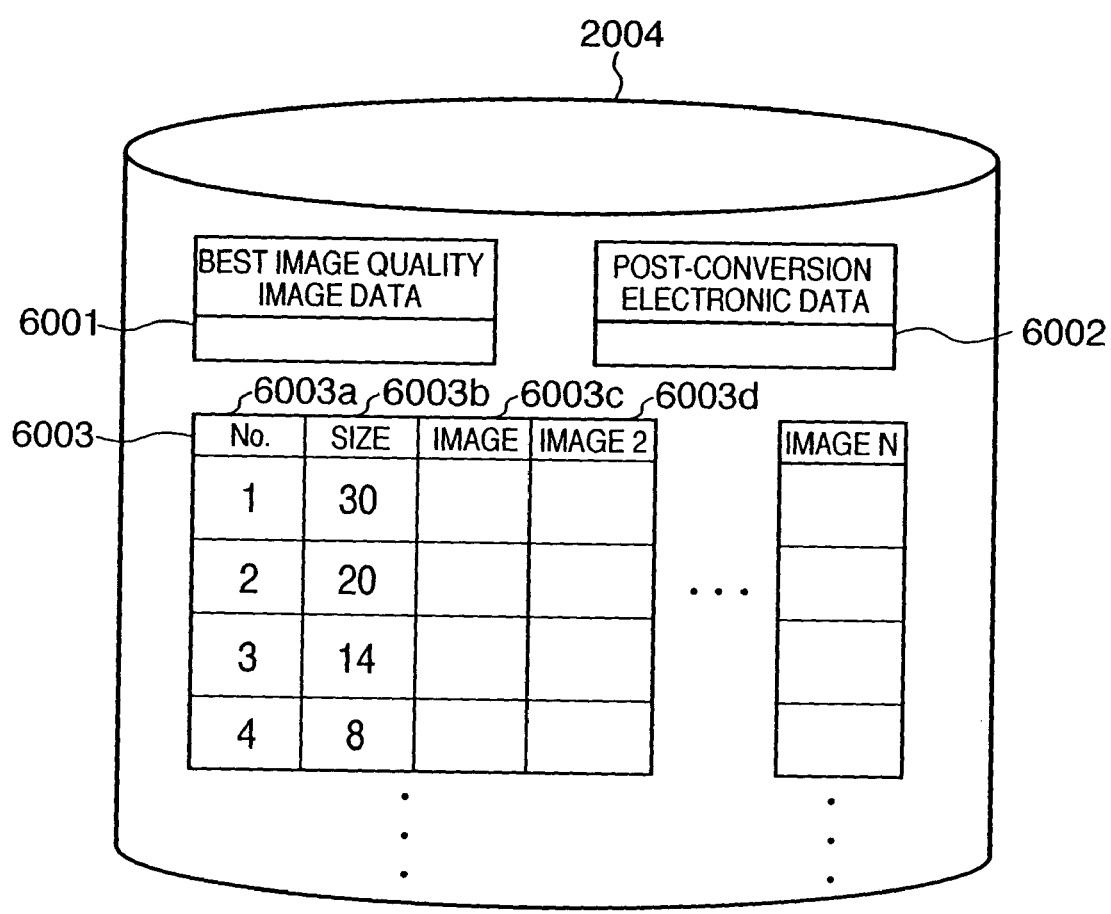
FIG. 6 is a diagram showing the detailed structure of the HDD 2004 shown in FIG. 5.

FIG. 6 is a diagram showing the structure of a data area 6001, data area 6002 and a data table 6003 saved on the HDD 2004 shown in FIG. 5. The data area 6001 is an area for saving the digital image data (sometimes also called electronic data) scanned at the highest possible resolution that the MFP 220 can attain. The data area 6002 is an area for saving the image data converted at a selected resolution. The data table 6003 is a table in which the image data of a fixed area that includes character images of each size is registered. The registered fixed area image data, for each size, includes image data of a plurality of resolutions selected by the user. In FIG. 6, an index (the numbers 1, 2, . . . in the left column) for each size is included, but in an actual table such an index is not always necessary. Moreover, the plurality of resolutions is the same for each size.

Figure 7:
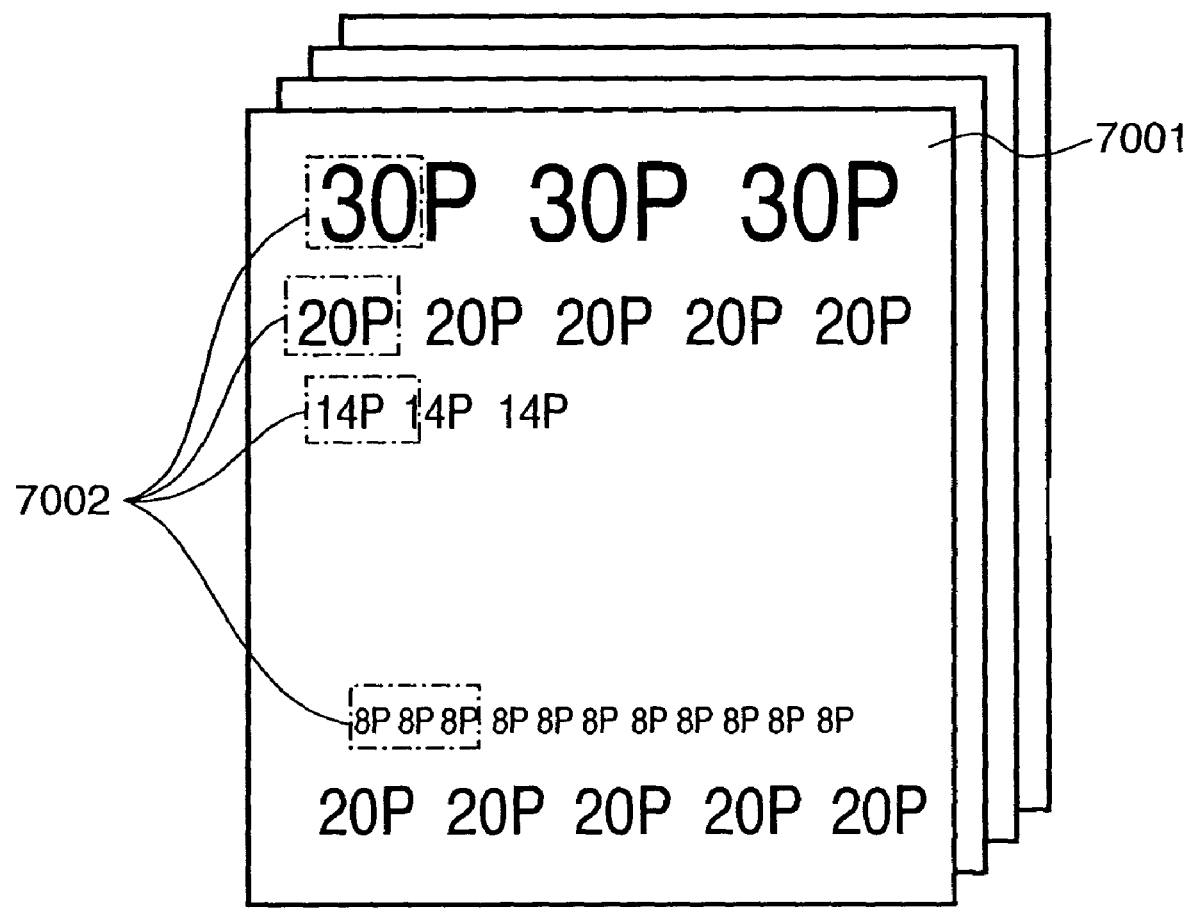
FIG. 7 is a diagram showing a sample paper medium described in the embodiment.

FIG. 7 is a diagram showing a sample paper set in the tray 2073 shown in FIG. 3. FIG. 7 shows that the document 7001 on the paper is composed of fonts 7002 of different point sizes. In the example shown in FIG. 7, characters of four different sizes, 30 point, 20 point, 14 point and 8 point, are included in the first page of the document.

(MFP Operation)

Next, a description is given of the operation of a process of digitizing (filing) a document using the MFP shown in the present embodiment. This embodiment is a system that converts an original document composed of paper or the like into electronic data using the MFP described above and then confirms the quality of the characters using the same MFP.

Figure 9:
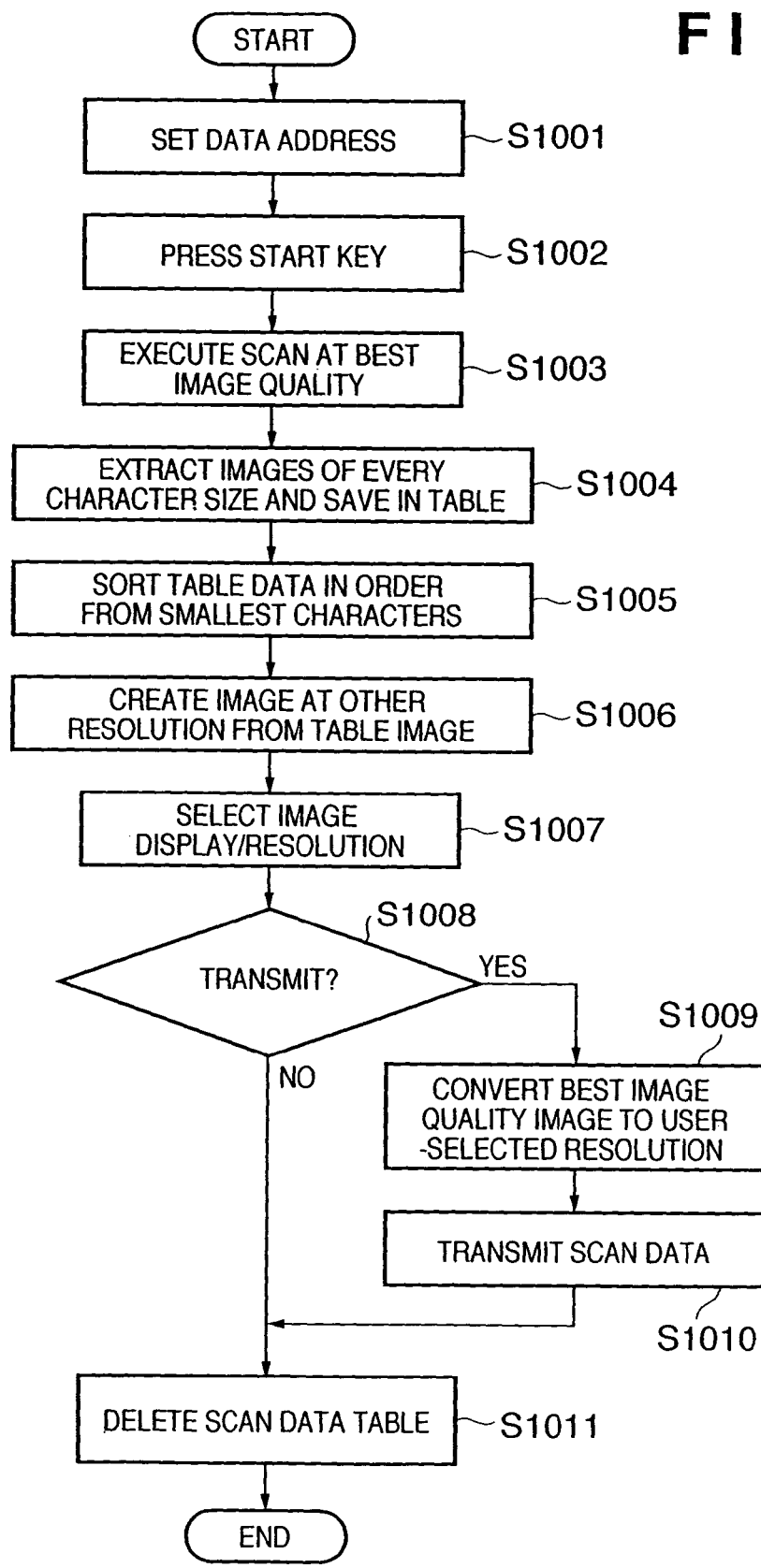
FIG. 9 is a flow chart of a scan data confirmation system described in the embodiment.

FIG. 9 is a flow chart illustrating a processing procedure for confirming scanned image data in the MFP 220. First, in a step S1001, the user specifies creating electronic data from paper and the address for the electronic data thus created. Specifying an address for the electronic data may be substituted for specifying digitization. The address specified may be an e-mail address or a folder connected to the network. In order to cause the CPU 2001 to make this specification, for example, a screen is displayed that prompts input to the control panel 2012, and the address input by the user therefor is saved in a fixed area of the RAM 2002 or the hard disk 2004.

In step S1002, the user presses the MFP start key 2014, which starts execution of the work of creating electronic data from the paper set on the tray 2073 shown in FIG. 3. As a result, the CPU 2001 conducts key polling or monitors interrupts, and detects that the start key 2014 has been pressed. When it is determined that the start key has been pressed, processing proceeds to step S1003. Preferably, step S1002 involves not only waiting for the start key but identifying input and proceeding according to that input. In that case, step S1003 does not necessarily follow step S1002, and processing proceeds to step S1003 only when the input is the start key. FIG. 9 shows such a case. Step S1003 and the succeeding steps indicate the control procedure exerted by the CPU 2001.

In step S1003, the apparatus executes a scan of the original document image at the highest resolution (that is, at the best image quality) of which the MFP 220 according to this invention is capable, and creates electronic data. The electronic data thus created is then saved in the data area 6001 shown in FIG. 6.

In step S1004, a character recognition process is carried out on the electronic data thus created. The character recognition process can be conducted using currently known methods, but in the character recognition of the present embodiment, identification the characters, in other words coding of the characters, is not necessary. Simply recognizing a character area and cutting out an image of every character from that area (so-called "character clipping") is sufficient. Then, the recognized character size or character clipped image area size is identified. The identification of size can be conducted, for example, on the basis of the length of the sides of a square area, or the length of the sides of the character cut-out area. It should be noted that the process of recognizing at least the character size of the character image is in this embodiment called character size recognition process.

Using the character size thus identified, image data for every character size is extracted from the electronic data (that is, the image data saved in area 6001). At this time, the extraction range may be that range necessary for LCD display, although preferably at least one whole character should be included therein. In addition, although preferably the size of the characters included in a single range thus extracted is uniform, a plurality of character images of different sizes may be included in that range. Moreover, where characters of extremely different sizes are adjacent to each other, such as, for example, when Chinese characters (kanji) are written with their kana (syllabic rendering), or equations with their suffixes, these may be treated as a single character. In other words, where characters whose sizes differ by more than a certain point are adjacent to each other, a range that includes all these characters may be extracted. Furthermore, as described in step S1006, image data with a reduction in the resolution of the image of the extracted range is generated later. Since the LCD display resolution is fixed at approximately 100 dpi, for example, if the image resolution (the pixel density) is reduced, the size of the displayed image shrinks. Accordingly, given that the resolution is later to be reduced, the range of image data to be extracted in step S1004 should be approximately 2×, 4× or 8× (length ratio) the range to be displayed.

The extracted image data is stored in the image column 6003c and the character size is stored in the size column 6003b of the data table 6003 shown in FIG. 6. It should be noted that, in the data table 6003, each time image data including character images of different sizes is extracted, the index number 6003a is incremented and a new data sequence is created, and that data sequence (also called a record) is paired with the image data and the included character size and stored. In the data table 6003, it is sufficient to register one character image for one character size. For image data of a range that includes character images of a plurality of different sizes, one size is picked out and stored. It should be noted that, in the present embodiment, in step S1003 scanning can be conducted of an original consisting of a plurality of pages. The process in step S1004 may be carried out either for the entire image of a single page or for all the character sizes contained therein. In that case, a character is clipped from the edge of the image and subjected to a character size recognition process. Then, image data of a portion in which characters of a given character size appear first is saved in the data table 6003 together with its size. Characters of that size that reappear may be ignored while that particular page is being processed.

It should be noted that, in order to shrink the time needed for character recognition, step S1004 maybe conducted on a portion. In that case, the target range can be one that, for example, limits the length of either the height or the width of the image. Moreover, preferably, the position of the range is the left edge or the vicinity of the center of the image where the length is limited in the horizontal direction, or the top edge where the length is limited in the vertical direction. Preferably, the range is a fixed width near the left edge if the original document is one in which the text is written horizontally, or a fixed height near the top edge if the original document is one in which the text is written vertically. If it is difficult to determine whether the text is written vertically or horizontally, then character size recognition that assumes both may be performed for one piece of image data. By so doing, an area that includes the title of the document and each paragraph of the text body can be targeted for character recognition. It is sometimes the case that character sizes differ between the title and the body, or between different paragraphs in the body, and the foregoing method enables the extraction of character images of a plurality of sizes in a limited range.

In step S1005, based on the information in the size column 6003b in the data table 6003 shown in FIG. 6, the data sequence is rearranged in ascending order. Of course, the data sequence may be rearranged in descending order as well. It should be noted that the method of rearrangement used here is not limited to ascending order or descending order, and may involve order of frequency of use of each size used in the electronic data. Where rearranging the data sequence in the order of frequency of use, character size recognition across the entire image of a single page is carried out, and the frequency of appearance of every character size is calculated. That frequency of appearance is, for example, registered in the data table 6003 for every character size. The records of the data table 6003 are then sorted using that frequency of appearance as a key. The index 6003a of rearranged records is revised in the order of rearrangement.

In step S1006, image data with the resolution or the image quality level reduced by one level is created from the best image quality image data entered in the image column 6003c of the data table 6003 shown in FIG. 6 and saved in an image 2 column 6003d. Image data in which the resolution/image quality level is further reduced by one level is then saved in an image 3 column, not shown, and image data in which the resolution/image quality level is still further reduced by one level is then saved in an image 4 column, not shown, and the process repeated until the lowest resolution or worst image quality is attained. It should be noted that the lowest resolution may, for example, be separately specified by the user, or it may be decided in advance.

For example, if the highest resolution (that is, the resolution at which the image data is scanned) is 600 dpi, then a portion of an image that includes that character image at that resolution is registered (stored) in the image column 6003c. In step S1006, the resolution of that image is then halved by, for example, thinning every other pixel in both the vertical and horizontal directions. As a result, 300 dpi image data is obtained and registered in the image 2 column 6003d. This operation is then similarly repeated to reduce resolutions and create images of 150 dpi and 75 dpi, which are then registered in the data table. If the predetermined lowest resolution is 75 dpi, then image data with resolutions of four types (600, 300, 150 and 75 dpi) is registered for a single size. Of course, the invention is not limited to the numerical values given here, and these can be adjusted depending on the performance of the device. In addition, the rate of reduction of resolution is not limited to ½. Moreover, the method of converting the resolution is not limited to simple thinning, and can be accomplished, for example, by taking the average pixel value of an area of 2×2 pixels as one pixel of image data after resolution reduction. Of course, other methods may also be adopted.

Figure 8:
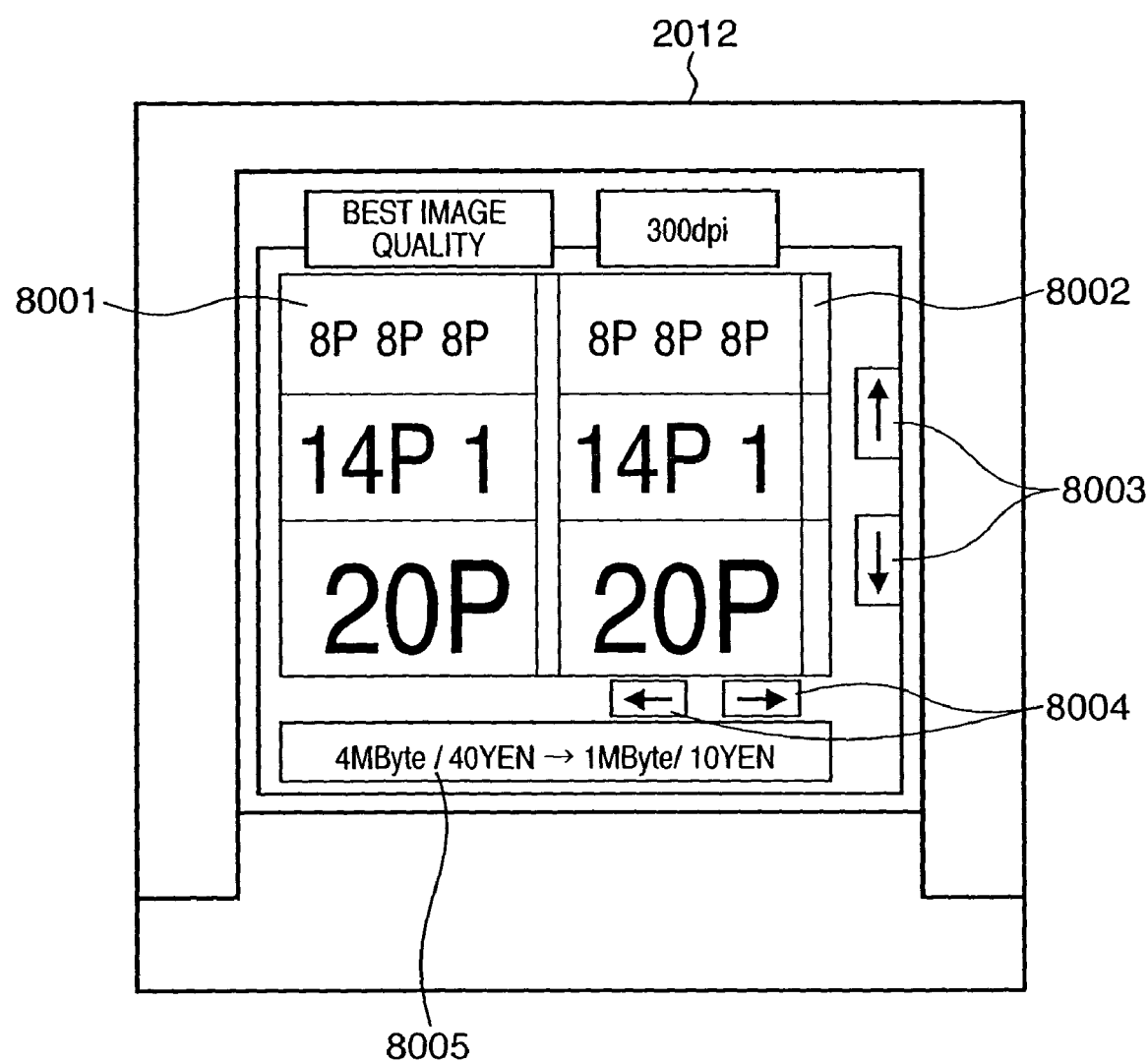
FIG. 8 is a diagram showing one user interface described in the embodiment.

In step S1007, electronic data display and user selections are obtained by causing a user interface, one example of which is shown in FIG. 8, to be displayed on the control panel 2012. The best image quality image data saved in the image column 6003c of the data table 6003 shown in FIG. 6 is displayed in order of index of the table 6003 in area 8001 (best image quality display column) of the LCD shown in FIG. 8. In the present example, the image data is arranged in order starting with the smallest character sizes, and therefore is displayed in that same order. Furthermore, image data entered in any of image 2 column 6003d—image N column of data table 6003 shown in FIG. 6 is displayed in an area 8002 of the LCD (variable image quality display column) in the order in which it is arranged. The display on the LCD is intended to enable the user to confirm the image quality, and therefore is performed without matching the image resolution to the LCD display resolution, that is, without losing image data pixels.

Touch panel buttons 8004 shown in FIG. 8 are resolution selection buttons with the capacity to change the resolution (image quality) of the image data displayed in the variable image quality display column 8002. For example, if the right-arrow button is pressed, image data of a resolution one level reduced is retrieved from the relevant record in the table 6003 and displayed. If the left-arrow button is pressed, image data of a resolution one level enhanced is retrieved from the relevant record in the table 6003 and displayed. For example, assume that the image data displayed in the variable image quality column 8002 is the image data in image 2 column 6003d. In this case, when the right-arrow button is pressed, image data from the image 3 column, in which the resolution is reduced one level in the same record thereof, is displayed in the variable image quality column 8002. When the left-arrow button is pressed, image data from the image column 6003c, in which the resolution is enhanced one level in the same record thereof, is displayed in the variable image quality column 8002. The currently selected resolution is stored in the memory. Of course, instead of the resolution itself, an index value indicating the resolution may be stored.

It should be noted that the range that can be displayed in the variable image quality column 8002 is the range of resolutions registered in the data table 6003, in other words, from the image column resolution to the image N column resolution. The touch panel buttons 8003 shown in FIG. 8 are scroll buttons with the capacity to change the character images displayed in the best image quality display column 8001 and the variable image quality display column 8002 simultaneously. When the downward arrow button is pressed, the character images in the areas are scrolled upward until characters one size larger than characters displayed up to now are displayed at the bottom. For example, if the downward arrow button is pressed in the situation illustrated in FIG. 8, from the top down characters of 14 point, 20 point and 30 point are displayed in both the best image quality display column 8001 and the variable image quality display column 8002. If the button 8003 upward arrow button is pressed, the characters displayed in each area are scrolled downward until characters one size smaller than characters displayed up to now are displayed at the top. After the example described above, if the upward arrow button is pressed, from the top down characters of 8 point, 14 point and 20 point are displayed in both the best image quality display column 8001 and the variable image quality display column 8002, returning to the display state shown in FIG. 8. A charge display column 8005 displays the data size and the charge for transmitting data if it is decided to transmit or to save image data at the resolution (or image quality level) displayed in the variable image quality display column 8002, in the form of a comparison with the case of the best image quality. In addition, the charge display column 8005 display content is revised according to the resolution of the image displayed in the variable image quality display column 8002 by pressing the touch panel buttons 8004. For example, if the charge is levied in units of 1 Mbyte, then the unit charge is stored in a fixed location of the memory and that unit charge multiplied by the data size (Mbyte) to obtain the charge. By storing the size of the image data scanned at the highest resolution in step S1003, the square of the ratio of the highest resolution and the selected resolution can be obtained by multiplying the data size of the image data of the highest resolution stored.

In step S1008, it is determined whether the key pressed as the user's final decision is the start key 2014 shown in FIG. 4, in other words a key indicating a decision to transmit, or the reset key 2017 shown in FIG. 4, in other words a key indicating cancellation of an operation. Here, if the key that the user pressed is the start key 2014, then processing shifts to the process in step S1009. If the key that the user pressed is the reset key 2017, then processing shifts to step S1011.

In step S1009, the electronic data of the best image quality saved in the data area 6001 shown in FIG. 6 is converted into electronic data of the resolution/image quality level selected in step S1007 and saved in the data area 6002 shown in FIG. 6.

In step S1010, the electronic data saved in the data area 6002 shown in FIG. 6 is transmitted to the data address set in S1001. At this time, the charge is confirmed, and therefore information pertaining to the charge can be output.

In step S1011, all the data saved in the data area 6001, the data area 6002 and the data area 6003 shown in FIG. 6 is deleted. In addition, the data temporarily stored during the procedure shown in FIG. 9 may also be deleted.

By the foregoing procedure, the multifunction copier of the present embodiment enables the user to display samples of character images at each resolution for characters of a variety of different sizes included in a digitized document. As a result, the user can select or set a resolution as adequate as necessary from among samples displayed by the multifunction copier that digitizes the document. Furthermore, by limiting the target range for the character size recognition process, the speed of processing can be increased.

Moreover, the scanned image data can be transmitted to a desired address, or saved, at the selected or set resolution. As for the image samples, by displaying images of the highest resolution and the selected resolution side by side, confirmation can be made easier.

(Variation)

In the first embodiment, an area for which a character size recognition process for a character image included in image data is carried out is either the entire scanned image or a partial area of a position and length limited in terms of width and height. However, by allowing the user to specify the target area, a more limited area can be targeted for more accurate character size recognition. For example, in step S1004 shown in FIG. 9, the entire image of, for example, the first page of a scanned image, is reduced and displayed on the control panel 2012 for the user. The user can then specify an appropriate range by indicating, for example, opposed diagonal points on the touch panel. Character size recognition is then carried out within that specified range. Of course, character size recognition is carried out using image data of the highest resolution scanned. It is possible that characters of different character sizes appear sporadically throughput the image, and therefore specification of a plurality of ranges may be permitted. By so doing, the range through which character size recognition is carried out can be effectively limited, making it possible to achieve increased speed in processing. It should be noted that this variation can also be applied to a second embodiment.

In addition, although in the embodiment the scanned resolution is the highest resolution of the apparatus, the scanned resolution may also be merely the highest resolution required. For example, technically, image scanner resolutions of several thousand dpi can be achieved. Even if such types of resolutions were the highest resolutions for the apparatus, it is probable that a highest resolution of approximately 600 dpi would be sufficient for document storage. Accordingly, a fixed resolution that is lower than the highest resolution of the apparatus may be used as the highest resolution value in the embodiment.

Second Embodiment

A detailed description is now given of an image processing system according to a second embodiment of the present invention, with reference to the drawings. It should be noted that although a brief description is given of those steps in common with the first embodiment, their content is not different from that of the first embodiment. In addition, the configuration of the image processing apparatus and the like is as shown in FIGS. 1-8, and therefore is substantially identical to that of the first embodiment. However, because in this embodiment the data table 6003 shown in FIG. 6 is created for every page, it assumes the configuration shown in FIG. 11.

Figure 10:
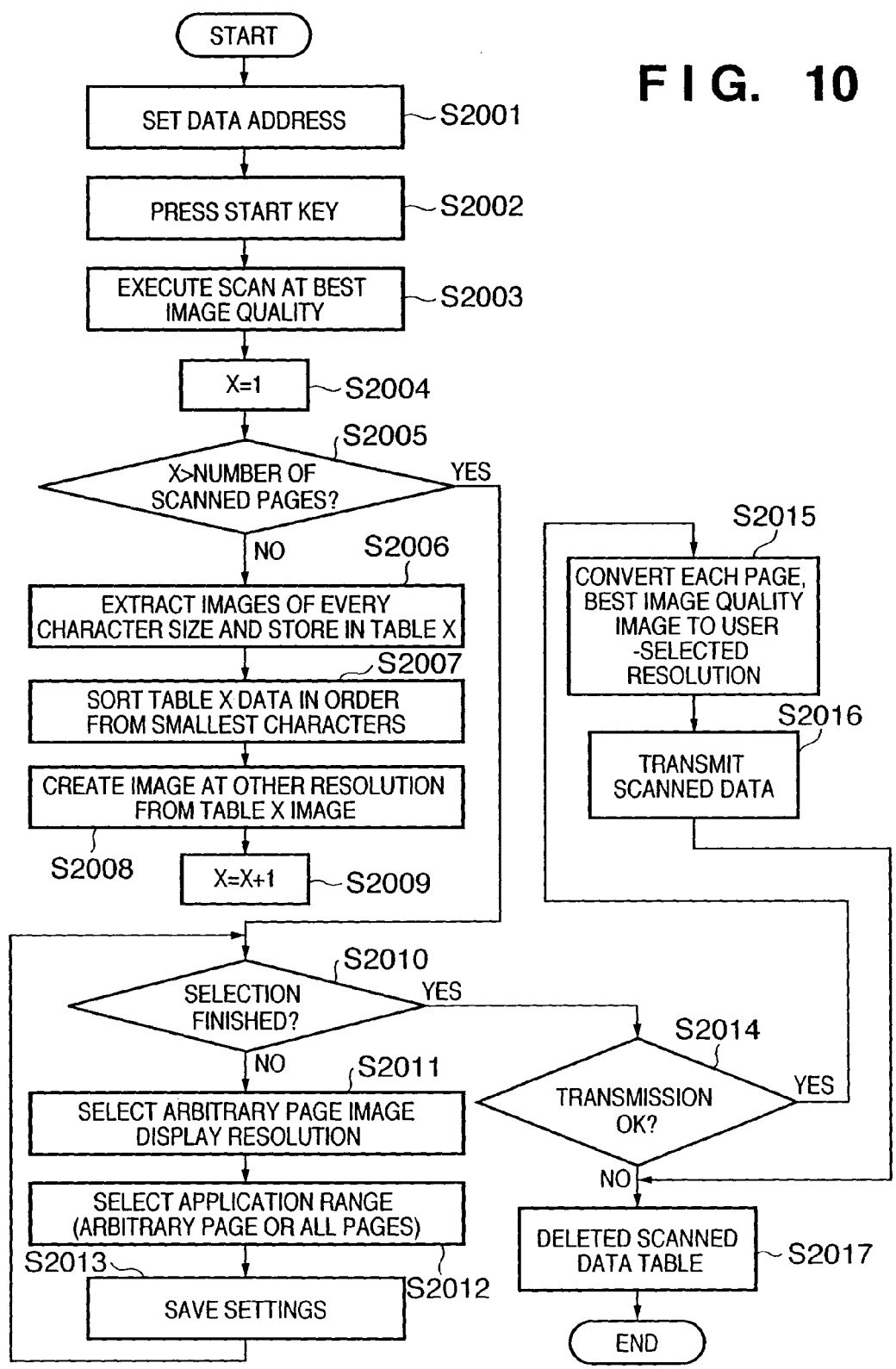
FIG. 10 is a flow chart illustrating a scan data confirmation system described in a second embodiment of the present invention.
Figure 11:
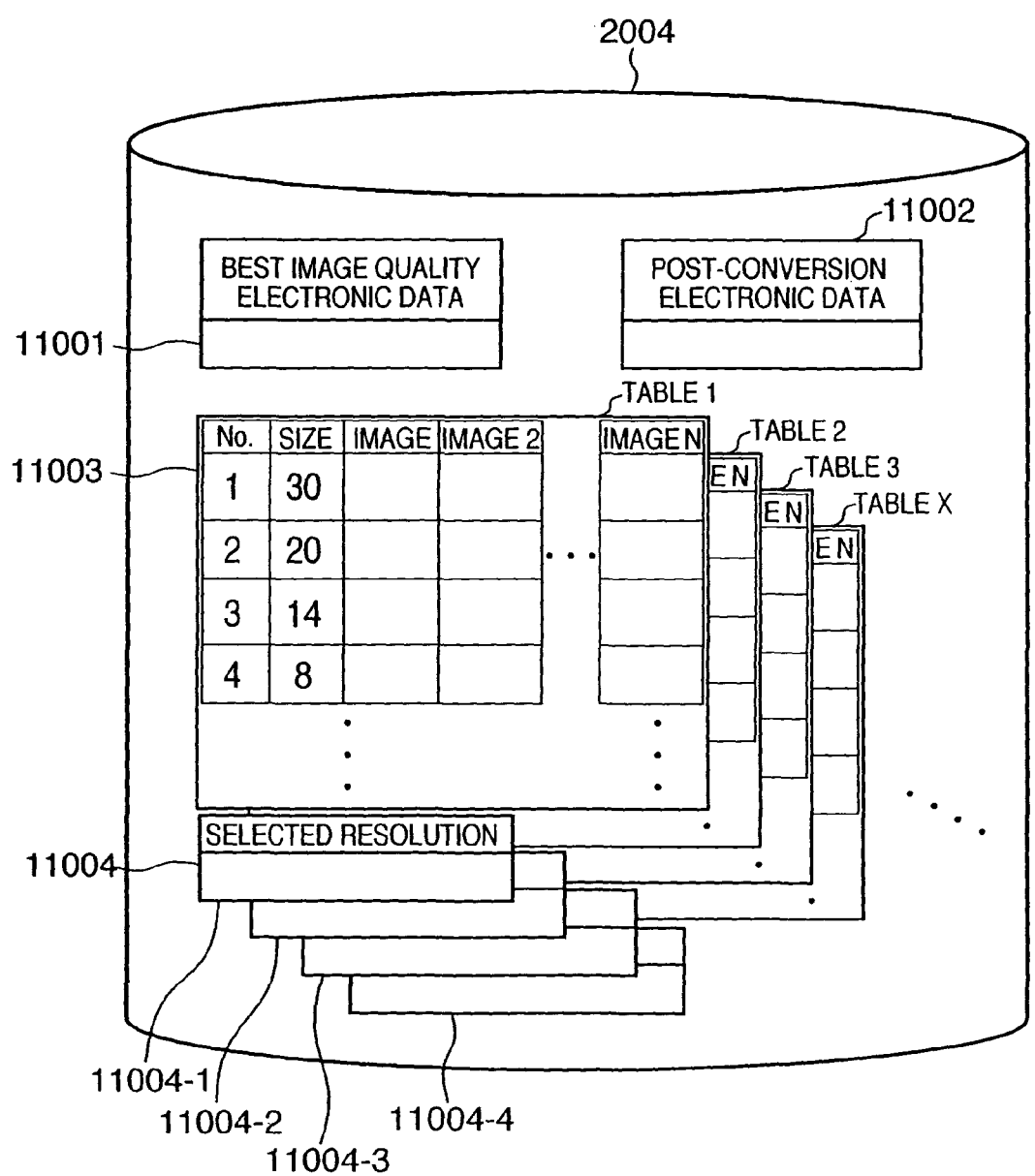
FIG. 11 is a diagram showing the structure of an HDD 2004 shown in FIG. 5 according to the second embodiment.
Figure 12:
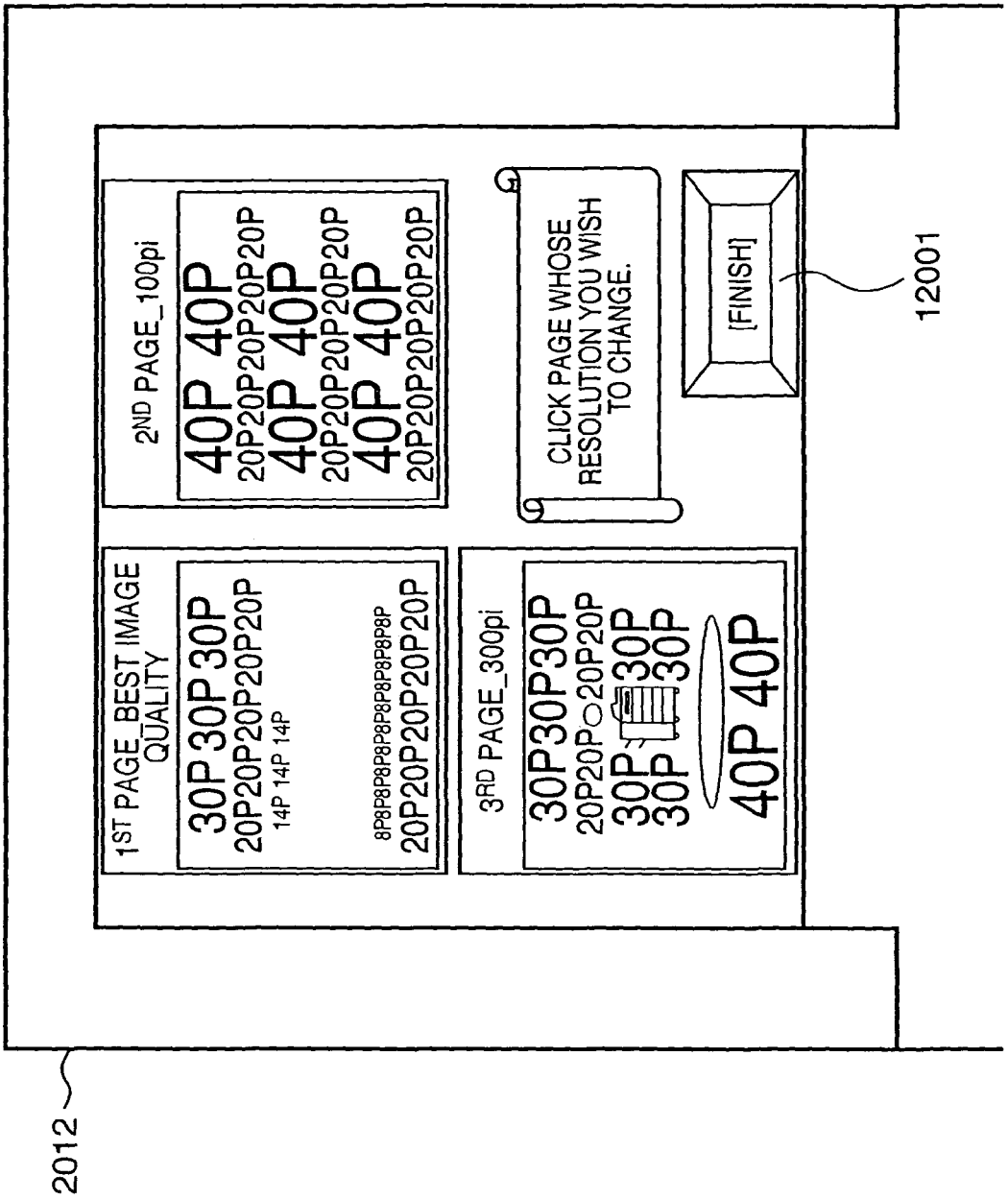
FIG. 12 is a diagram showing one user interface according to the second embodiment.
Figure 13:
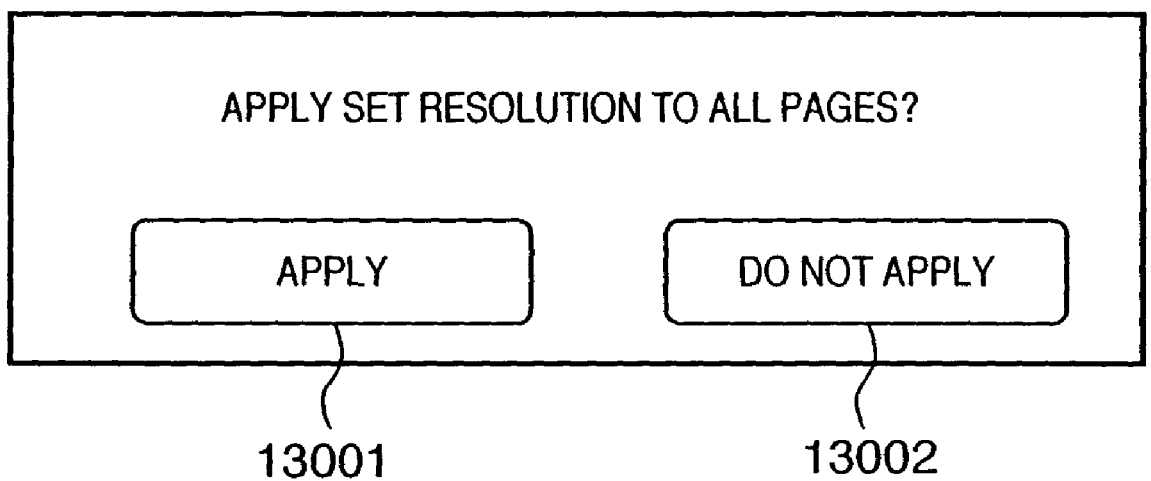
FIG. 13 is a diagram showing one message box interface according to the second embodiment.
Figure 14:
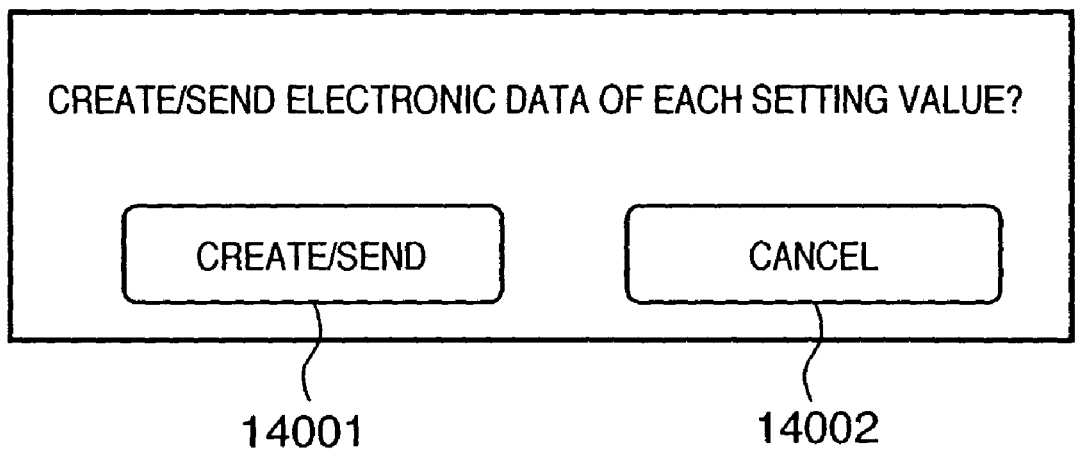
FIG. 14 is a diagram showing one message box interface according to the second embodiment.

FIG. 10 is a flow chart illustrating the processes of the second embodiment of a scan data confirmation system, a procedure executed in this embodiment in place of that shown in FIG. 9 of the first embodiment. FIG. 11 is a structural diagram showing the data area 11001 and data area 11002 and data area 11003 and data area 11004 held in the HDD 2004 shown in FIG. 5. FIG. 12 is the control panel 2012 shown in FIG. 4, showing one example of the LCD display of the present invention. FIG. 13 and FIG. 14 show examples of message boxes confirming the user's intentions.

First, the user specifies the address of the electronic data created from the paper in step S2001 shown in the flow chart shown in FIG. 10. The specified address may be an e-mail address or a folder connected to the network.

In step S2002, the system awaits the pressing of the MFP start key by the user. When the start key is pressed, the system executes the work of creating electronic data from the paper set in the tray 2073 shown in FIG. 3.

In step S2003, the system executes a scan using the highest resolution or the highest image quality scanning mode in the MFP of the present embodiment and creates electronic data. The electronic data thus created is then saved in the data area 6001 shown in FIG. 6. In addition, if the scanned original document consists of multiple pages, the number of pages is stored in the memory.

In step S2004, 1 is substituted for a temporary variable X. It should be noted that space for the variable X is retained in the RAM 2002 shown in FIG. 5.

In step S2005, the variable X and the number of pages of paper scanned in step S2003 are compared. If the results of the comparison indicate that variable X is greater than the number of pages scanned, processing shifts to step S2010. If variable X is equal to or less than the number of pages scanned, processing shifts to the process in step S2006.

In step S2006, image data like the character images 7002 shown in FIG. 7 is extracted for every character size using the character sizes used in the created electronic data. At this time, the extraction range may be that range necessary for LCD display. The extracted image data is then saved in an image column of a table X included in a data table group 11003 shown in FIG. 11, and the character sizes are saved in a size column of the table X. It should be noted that, in the data table group 11003, each time image data of a different character size is extracted, the index is incremented and a new data sequence is created, with image data and size stored in that new data sequence.

In step S2007, the data sequence is rearranged in ascending order based on the information entered in the size column of the table X included in the data table group 11003 shown in FIG. 11. It should be noted that the method used here to rearrange the data sequence is not limited to ascending order, and may instead be based on descending order, or on order of frequency of use based on the number of characters used in the electronic data.

In step S2008, image data of a resolution or a image quality level that is reduced by one level is created from the best image quality image data entered in the image column of table X included in the data table group 11003 shown in FIG. 11 and stored in the image 2 column. Image data in which the resolution/image quality level is further reduced by one level is then saved in an image 3 column, and image data in which the resolution/image quality level is still further reduced by one level is then saved in an image 4 column, and the process repeated until the lowest resolution or worst image quality is attained. In step S2009, the variable X is incremented and processing returns to step S2005. Steps S2001-S2003, and steps S2006-S2008, except for differences in the structure of the created data table 11003, correspond to steps S1001-S1006 shown in FIG. 9.

In step S2010, the user interface, of which the screen display shown in FIG. 12 is one example, is displayed on the control panel 2012, and the page that the user wishes to select as well as the end of the selection operation are confirmed. If completion of the setting operation is selected in step S2010, processing shifts to the process in step S2014. If one of the pages has been selected by the user in step S2010, processing shifts to the process in step S2011. The user presses the page he or she wishes to select. The depressed position is then identified and the page corresponding to that position is then saved as the selected page using the page number or the like.

In step S2011, the electronic data is displayed and the user's selections obtained by displaying on the control panel 2012 the user interface for the selected page, one example of which is shown in FIG. 8. Image data of the best image quality saved in the image column of the table corresponding to the page that the user selected in step S2010 in the data table group 11003 shown in FIG. 11 is displayed in the best image quality display column 8001 in order of index number. Image data entered in any of the image 2-N columns of the same table in the table group 11003 shown in FIG. 11 is displayed in the adjacent variable image quality display column 8002 in response to user selection, in the same order as the order of display in the best image quality display column 8001. In addition, the touch panel buttons 8004 shown in FIG. 8 have the capacity to change the resolution of the image data displayed in the display column 8002. For example, pressing the right-arrow button reads out and displays from the relevant table image data with a resolution/image quality level that is one level reduced, and pressing the left-arrow button reads out and displays from the relevant table image data with a resolution/image quality level that is one level enhanced. It should be noted that the range that can be displayed in the display column 8002 is the range of image data entered in the table group 11003 shown in FIG. 11, that is, from the image column best image quality to the image N column worst image quality.

The touch panel buttons 8003 shown in FIG. 8 have the capacity to scroll the characters displayed in the display column 8001 and the display column 8002 simultaneously. When the downward arrow is pressed, the characters in the LCD are scrolled upward until characters one size larger than characters displayed up to now are displayed at the bottom. For example, if the downward arrow button is pressed in the situation illustrated in FIG. 8, from the top down characters of 14 point, 20 point and 30 point are displayed in both display column 8001 and display column 8002. If the button 8003 upward arrow button is pressed, the characters displayed in each display column are scrolled downward until characters one size smaller than characters displayed up to now are displayed at the top. After the example described above, if the upward arrow button is pressed, from the top down characters of 8 point, 14 point and 20 point are displayed in both display column 8001 and display column 8002. The charge display column 8005 displays the data size and the charge for data transmission of electronic data of the resolution/image quality level displayed in display column 8002, in the form of a comparison with the case of the best image quality. In addition, the charge display column 8005 display content is switched in tandem with the operation of the touch panel buttons 8004. After a series of operations, the user settings are set when the start key 2014 is pressed. When the user presses the start key, the image resolution selected at that time or an index value indicating that image resolution is saved.

In step S2012, a message box, one example of which is shown in FIG. 13, is displayed on the control panel 2012, the user is permitted to select whether or not to apply the user-selected resolution/image quality settings to all pages, and the results identified. The user presses the "apply" button 13001 if the user wishes to apply the selected settings to all pages. If not, the user presses the "do not apply" button 13002. The pressed button is saved in memory and referred to in step S2013.

In step S2013, if the results of the confirmation at step S2012 indicate that the selected settings are to be applied to all pages, then the image resolution selected and saved in step S2011 is saved as the selected resolution for all tables in a selected resolution area 11004 shown in FIG. 11. If the selected settings are not to be applied to all pages, then the selected resolution is saved as the selected resolution for the relevant tables for the pages selected in step S2010 in the selected resolution area 11004 shown in FIG. 11.

In step S2014, a message box, one example of which is shown in FIG. 14, is displayed on the control panel 2012, and it is confirmed if electronic data is to be created and sent. If the user selects the "create/send" button 14001, the process diverges to "YES" in step S2014.

In step S2015, the electronic data of the best image quality saved in data area 11001 shown in FIG. 11 is converted into electronic data of the resolution/image quality level selected for each page in steps S2010-S2013. The converted image data is saved in data area 11002 shown in FIG. 11.

In step S2016, the electronic data saved in data area 11002 shown in FIG. 11 is transmitted to the data address set in step S2001.

In step S2017, all the data in data area 11001, data area 11002, data area 11003 and data area 11004 shown in FIG. 11 is deleted.

Figure 15:
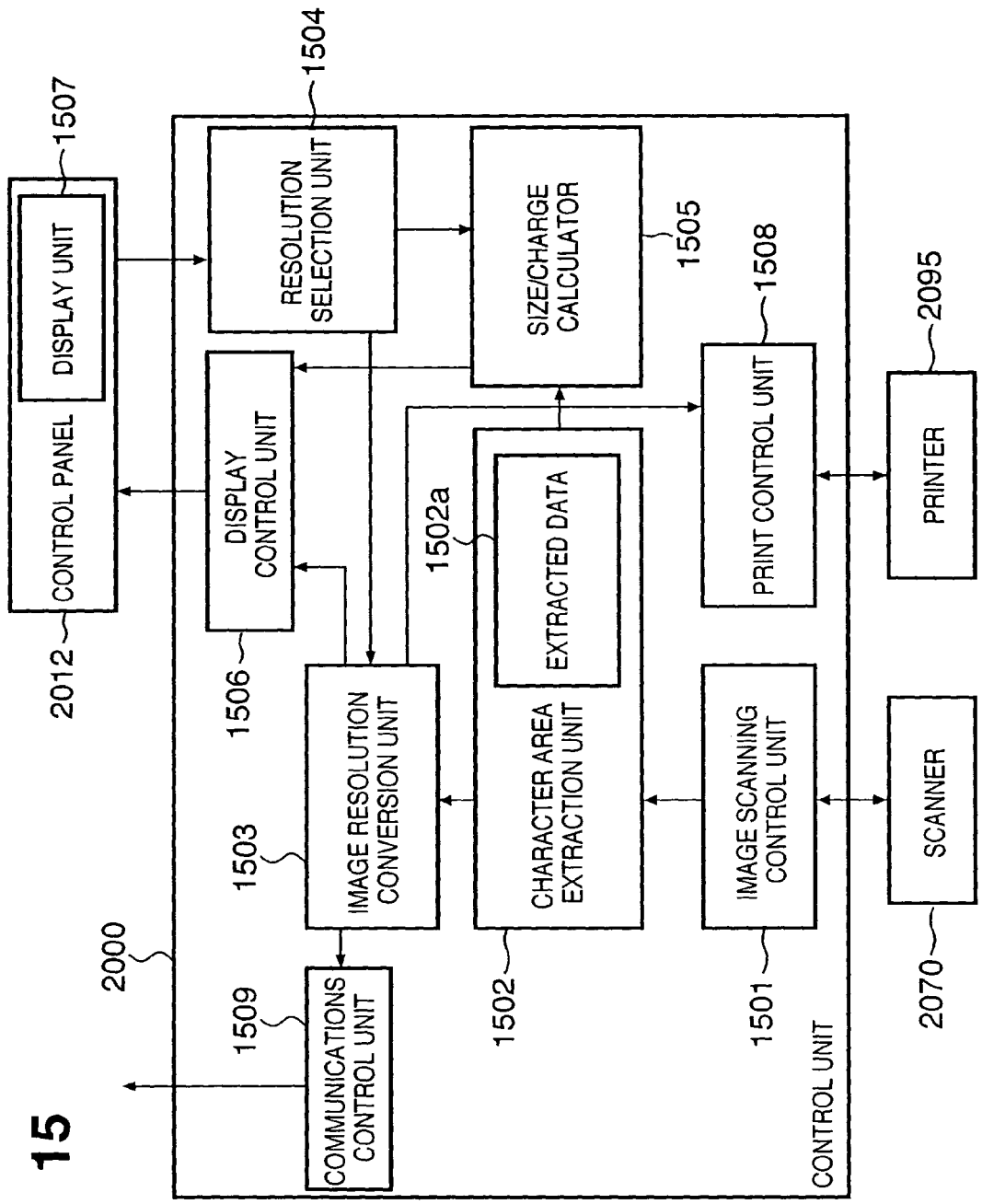
FIG. 15 is a functional block diagram of an image processing apparatus according to a second embodiment.

FIG. 15 is a functional block diagram of an image processing apparatus according to the present embodiment. FIG. 15 expresses in a simplified way the functions of the apparatus of the invention described in the detailed description. In FIG. 15, an original image is scanned by the scanner (scanning means) 2070, image data is generated, and that image data is input to an image scanning control unit 1501. The image data is then further input to a character area extraction unit 1502 (extracting means). The character area extraction unit 1502 has an extracted data storage unit 1502a that saves the extracted data. The character area extraction unit 1502 manipulates the image data in raster order, for example, and extracts areas that include one character for one character size as samples. One such sample is then saved in the extracted data storage unit 1502a for every character size. An image resolution conversion unit 1503 then converts the image resolution of the image of the character area extracted by the character area extraction unit 1502 to a resolution specified from an image resolution selection unit 1504. The image data that has undergone resolution conversion by the image resolution conversion unit 1503 is then sent to the control panel 2012 through a display control unit 1506 and displayed on a display unit 1507. The user can then select a desired image resolution through a user interface provided by the resolution selection unit 1504 and displayed on the display unit 1507, and an image (specifically, a character area of an image) with the resolution selected by the user is displayed on the display unit 1507.

In addition, image data whose resolution has been converted by the image resolution conversion unit 1503 can also be transmitted to a communications network through a communications control unit 1509. The communications control unit 1509, may, for example, be a modem.

By contrast, a size/charge calculator 1505 calculates the total data size (the total size) of the scanned image data from the image scanning control unit 1501 and the charge for transmitting data of that size from the image communications unit 1509. In addition, the resolution selected from the image resolution selection unit 1504 is input to the size/charge calculator 1505, in accordance with which the size/charge calculator 1505 calculates the total data size of the image data converted to the selected resolution and the charge for transmitting that data from the image communications unit 1509. The calculated result is then sent to the control panel 2012 through the display control unit 1506 and displayed on the display unit 1507.

Furthermore, the image data whose resolution has been converted by the image resolution conversion unit 1503 is then transmitted to the printer 2095 through a print control unit 1508 and there printed.

Thus, as described above, the apparatus of the present embodiment can show the functions executed by the hardware and software working together as the blocks shown in FIG. 15.

The above-described arrangement makes it possible to select or to set the resolution for each page of a scanned original document. In addition, the scanned image data can be transmitted to a desired address, or saved, at the selected or set resolution. The setting or the selection of the resolution by the user can be carried out while displaying and checking image samples including character areas of the scanned image data on the display unit of the multifunction copier. Furthermore, by displaying images of the highest resolution and the selected resolution side by side, confirmation can be made easier.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-241198 filed on Aug. 20, 2004, which is hereby incorporated by reference herein.

What is claimed is:

1. An image processing apparatus comprising:
a scanning unit that converts a original image into image data having a first resolution;
an extraction unit that extracts respective areas, each of which containing a character of a character size, from the image data scanned by the scanning unit;
a storage unit that stores images of the respective areas into a table;
a calculation unit that calculates a frequency of appearance of each character size extracted by said extraction unit in the image data;
a sort unit that sorts the images of the respective areas based on the frequency of appearance of each character size calculated by said calculation unit so that the images are placed in order of frequency of appearance of each character size from the highest frequency to the lowest frequency;
a conversion unit that converts the images of the areas containing the characters having the first resolution which have been sorted by the sort unit into images of areas having a second resolution different from the first resolution; and
a display unit that displays in parallel the images of the areas that contain characters having the first resolution extracted by the extraction unit and the images of the areas that contain characters having the second resolution converted by said conversion unit,
wherein character sizes of the characters extracted by said extraction unit include at least the smallest character size in the original image, and
wherein said display unit displays both the images of the areas containing characters having the first resolution and the images of the areas containing characters having the second resolution in the order sorted by said sort unit.

2. The image processing apparatus according to claim 1, further comprising:
a specifying unit that specifies a desired image resolution from among the resolutions of images displayed by the display unit.

3. The image processing apparatus according to claim 1, wherein the extraction unit extracts areas that contain characters of every character size appearing for the first time in image data scanned by the scanning unit.

4. The image processing apparatus according to claim 1, wherein the scanning unit scans the original image at the best image quality of which the apparatus that scans the original image is capable.

5. The image processing apparatus according to claim 2, further comprising a transmission unit that transmits image data whose image resolution has been converted by the conversion unit to a specified address.

6. The image processing apparatus according to claim 2, further comprising a second display unit that displays a total size and charge for transmission of the image data scanned by the scanning unit and the total size and charge for transmission of image data whose image resolution has been converted by the conversion unit.

7. The image processing apparatus according to claim 2, wherein:
the scanning unit scans original images composed of a plurality of pages;
the extraction unit extracts areas that contain characters from image data of each page;
the conversion unit converts the image resolutions of images of the areas extracted for each selected page; and
the specifying unit receives a selection made by the user of a desired resolution for each page.

8. The image processing apparatus according to claim 7, wherein the specifying unit is further capable of carrying out a selection of applying a desired image resolution to all pages.

9. An image processing method comprising:
a scanning step of scanning an original image and converting it into digital image data having a first resolution;
an extraction step of extracting respective areas, each of which containing a character of a character size, from the image data scanned in the scanning step;
a storage step of storing images of the respective areas into a table;
a calculation step of calculating a frequency of appearance of each character size extracted in said extraction step in the image data;
a sort step of sorting the images of the respective areas based on the frequency of appearance of each character size calculated in said calculation step so that the images are placed in order of frequency of appearance of each character size from the highest frequency to the lowest frequency;
a conversion step of converting the images of the areas containing the characters having the first resolution which have been sorted in the sort step into images of areas having a second resolution different from the first resolution; and
a control step of displaying in parallel the images of the areas that contain characters having the first resolution extracted in the extraction step and the images of the areas that contain characters having the second resolution converted in said conversion step, wherein character sizes of the characters extracted in said extraction step include at least the smallest character size in the original image, and wherein said control step displays both the images of the areas containing characters having the first resolution and the images of the areas containing characters having the second resolution in the order sorted in the sort step.

10. A computer-readable storage medium which retrievably stores a computer-executable program for carrying out an image processing, comprising:

code of a scanning step of converting an original image into image data having a first resolution;

code of an extracting step of extracting respective areas, each of which containing a character of a character size, from the image data scanned by the scanning step;

code of a storage step of storing images of the respective areas into a table;

code of a calculation step of calculating a frequency of appearance of each character size extracted in said extraction step in the image data;

code of a sort step of sorting the images of the respective areas based on the frequency of appearance of each character size calculated in said calculation step so that the images are placed in order of frequency of appearance of each character size from the highest frequency to the lowest frequency;

code of a conversion step of converting the images of the areas containing the characters having the first resolution which have been sorted in the sort step into images of areas having a second resolution different from the first resolution; and code of a displaying step of displaying in parallel the images of the areas that contain characters having the first resolution extracted by the extracting step and the images of the areas that contain characters having the second resolution converted by said conversion unit, wherein character sizes of the characters extracted in said extraction step include at least the smallest character size in the original image, wherein said displaying step displays both the images of the areas containing characters having the first resolution and the images of the areas containing characters having the second resolution in the order sorted in the sort step.

\* \* \* \* \*